(12) United States Patent
Beisiegel et al.

(10) Patent No.: US 11,366,809 B2
(45) Date of Patent: *Jun. 21, 2022

(54) DYNAMIC CREATION AND CONFIGURATION OF PARTITIONED INDEX THROUGH ANALYTICS BASED ON EXISTING DATA POPULATION

(71) Applicant: International Business Machines Corporation, Armonk, NY (US)

(72) Inventors: Michael Beisiegel, Poughkeepsie, NY (US); Devaprasad K. Nadgir, Bangalore (IN); Vijay Chandra S. Telukapalli, Bangalore (IN); Venumadhav Vanagondi, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 395 days.

This patent is subject to a terminal disclaimer.

(21) Appl. No.: 14/824,116

(22) Filed: Aug. 12, 2015

(65) Prior Publication Data

US 2016/0171047 A1    Jun. 16, 2016

Related U.S. Application Data

(63) Continuation of application No. 14/567,167, filed on Dec. 11, 2014.

(51) Int. Cl.
*G06F 16/00* (2019.01)
*G06F 16/30* (2019.01)
*G06F 16/2453* (2019.01)
*G06F 16/27* (2019.01)
*G06F 16/22* (2019.01)

(52) U.S. Cl.
CPC ...... *G06F 16/2453* (2019.01); *G06F 16/2228* (2019.01); *G06F 16/278* (2019.01)

(58) Field of Classification Search
CPC ...... G06F 17/00; G06F 12/00; G06F 16/2453; G06F 16/2228; G06F 16/278; G06N 5/00
See application file for complete search history.

(56) References Cited

U.S. PATENT DOCUMENTS

| 7,640,244 | B1  | 12/2009 | Morris et al. |
| 7,693,813 | B1  | 4/2010  | Cao et al. |
| 8,527,544 | B1* | 9/2013  | Colgrove ............. G06F 3/0641 707/791 |
| 8,694,472 | B2  | 4/2014  | Marshall |

(Continued)

OTHER PUBLICATIONS

Bailis et al. "Scalable Atomic Visibility with RAMP Transactions"; http://www.bailis.org/blog/scalable-atomic-visibility-with-ramp-transactions, 2014; Retrieved from the Internet <URL: http://www.bailis.org/papers/ramp-sigmod2014.pdf> (Year: 2014).*

(Continued)

*Primary Examiner* — Alexandria Y Bromell
(74) *Attorney, Agent, or Firm* — Anthony Curro

(57) ABSTRACT

Partitioning of a monitored index commences upon receiving a trigger. Properties of the index are fetched and analyzed using a pipes analytics engine. A new partitioned index is generated and an alias is assigned to the new partitioned index. The alias is added to a partitioned index alias table.

10 Claims, 8 Drawing Sheets

(56) References Cited

U.S. PATENT DOCUMENTS

| | | | |
|---|---|---|---|
| 8,732,139 B2 | 5/2014 | Schreter | |
| 8,930,312 B1* | 1/2015 | Rath | G06F 16/278 707/634 |
| 2007/0067366 A1* | 3/2007 | Landis | G06F 12/1009 |
| 2010/0161569 A1* | 6/2010 | Schreter | G06F 16/2272 707/696 |
| 2011/0196855 A1 | 8/2011 | Wable | |
| 2011/0225165 A1* | 9/2011 | Burstein | G06F 16/2272 707/741 |
| 2012/0059823 A1 | 3/2012 | Barber et al. | |
| 2012/0143873 A1* | 6/2012 | Saadat | G06F 16/278 707/741 |
| 2012/0179684 A1 | 7/2012 | Alba et al. | |
| 2013/0117273 A1 | 5/2013 | Lee et al. | |
| 2014/0032525 A1* | 1/2014 | Merriman | G06F 16/244 707/713 |
| 2014/0032579 A1* | 1/2014 | Merriman | G06F 16/258 707/756 |
| 2014/0046909 A1* | 2/2014 | Patiejunas | G06F 16/24554 707/687 |
| 2014/0108587 A1* | 4/2014 | Goldberg | G06F 15/167 709/215 |
| 2014/0136545 A1* | 5/2014 | Calo | G06F 16/2246 707/743 |
| 2014/0297679 A1 | 10/2014 | Beisiegel et al. | |
| 2015/0134796 A1* | 5/2015 | Theimer | G06F 16/258 709/223 |
| 2015/0186187 A1* | 7/2015 | Weisberg | G06F 16/2379 707/747 |
| 2015/0254303 A1* | 9/2015 | Saadat | G06F 16/2228 707/716 |
| 2016/0171071 A1 | 6/2016 | Beisiegel | |

OTHER PUBLICATIONS

Pending U.S. Appl. No. 14/567,167, filed Dec. 11, 2014, Entitled: "Dynamic Creation and Configuration of Partitioned Index Through Analytics Based on Existing Data Population".

IBM, List of IBM Patents or Patent Applications Treated as Related, Appendix P, dated Feb. 26, 2016, 2 pages.

Kulkarni et al., "Document Allocation Policies for Selective Searching of Distributed Indexes", CIKM'10, Oct. 26-30, 2010, Toronto, Ontario, Canada.

Aouiche et al., "Data Mining-based Materialized View and Index Selection in Data Warehouses", Jul. 11, 2007, pp. 1-29.

Mell et al., "The NIST Definition of Cloud Computing", National Institue of Standards and Technology, Special Publication 800-145, Sep. 2011, pp. 1-7.

Pending U.S. Appl. No. 14/567,167, filed Dec. 11, 2014, entitled: "Dynamic Creation and Configuration of Partitioned Index Through Analytics Based on Existing Data Population", 38 pages.

Bailis et al. "Scalable Atomic Visibility with RAMP Transactions", SIGMOD' 14, Jun. 22-27, 2014, Snowbird, UT, USA, pp. 1-12.

* cited by examiner

DYNAMIC CREATION AND CONFIGURATION OF PARTITIONED INDEX THROUGH ANALYTICS BASED ON EXISTING DATA POPULATION

FIELD OF THE INVENTION

The present disclosure generally relates to data indexing systems, and more particularly to dynamic processing of partitioned indices.

BACKGROUND

Big Data systems handle a large amount of electronic data that is typically distributed over multiple virtual or physical computing nodes for storage and analysis. For example, Big Data may be stored in distributed search clusters in a discrete data container called an index. The index may include a set of shards that hold the actual data in hashed and searchable formats.

Under some circumstances, the index may be partitioned and linked to via one or more aliases that aggregate multiple partitioned indices into a single index for searching by analytics engines. One reason for partitioning the index into multiple indices is to improve search relevance and performance, such that the data that is most relevant at a given time is searched first.

BRIEF SUMMARY

According to embodiments of the invention, a method, system, and computer program product for partitioning an index monitor properties of the index and receive a trigger event to partition the index based on changes in the properties. Embodiments of the invention fetch properties of the index and execute one or more analytics pipes to determine, based on the fetched properties of the index, a dynamically generated partition configuration of the index. The index is partitioned according to the dynamically generated partition configuration based on results of executing the one or more analytics pipes.

DETAILED DESCRIPTION

Figure 1:
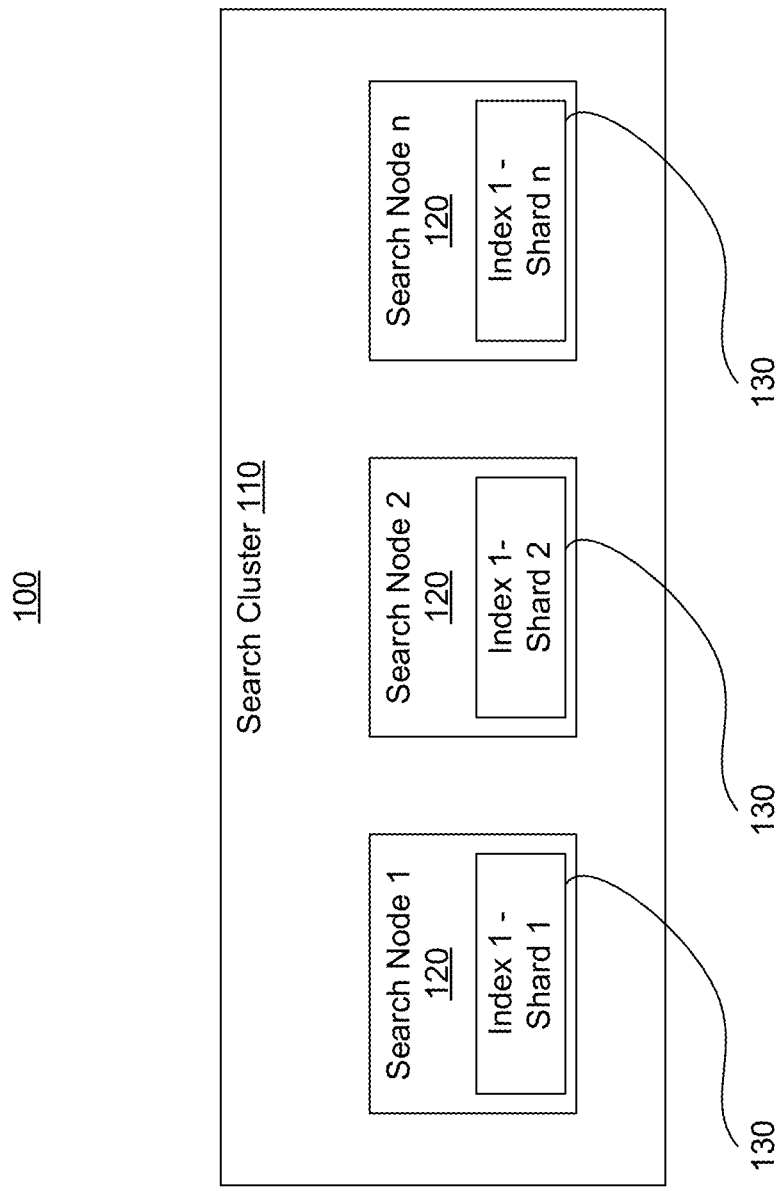
FIG. 1 is a block diagram depicting a partitioned index, according to an embodiment of the invention.

FIG. 1 is a block diagram depicting a partitioned index, Index 1, in a computing environment 100, according to an embodiment of the invention. Computing environment 100 may include a search cluster 110 that includes one or more search nodes 120, for example, Search Nodes 1-*n*. Each search node 120 may be a computing device as described in connection with FIG. 5, below, and may store one or more shards 130 (corresponding to a portion of Index 1), for example, Shards 1-*n*.

In one example, Index 1 may be initiated as having one shard 130, for example, Shard 1. As the size of Index 1 grows, so may the size of Shard 1. Over time, older data (also referred as cold data) may be moved into additional shards 130, for example, Shards 2-*n*, to accommodate the additional data.

In some circumstances Index 1 may be partitioned into sub-indices each having a set of shards. Partitioned sub-indices may be aggregated through aliases in an alias table. The aliases enable search cluster 110 to maintain a single view of Index 1 irrespective of the number of partitions that the index contains.

Under some circumstances, it may be desirable to partition or repartition Index 1. For example, some or all of the data in Index 1 may become old and no longer valid. In another example, Index 1 may be partitioned or repartitioned according to a predefined partitioning schedule (weekly, monthly, quarterly, etc.). In yet another example, Index 1 may acquire a predefined specific state. The predefined specific state may be, for example, Index 1's data size exceeding a predetermine threshold, or a search operation using Index 1 failing to meet a predefined minimum performance standard.

Figure 2:
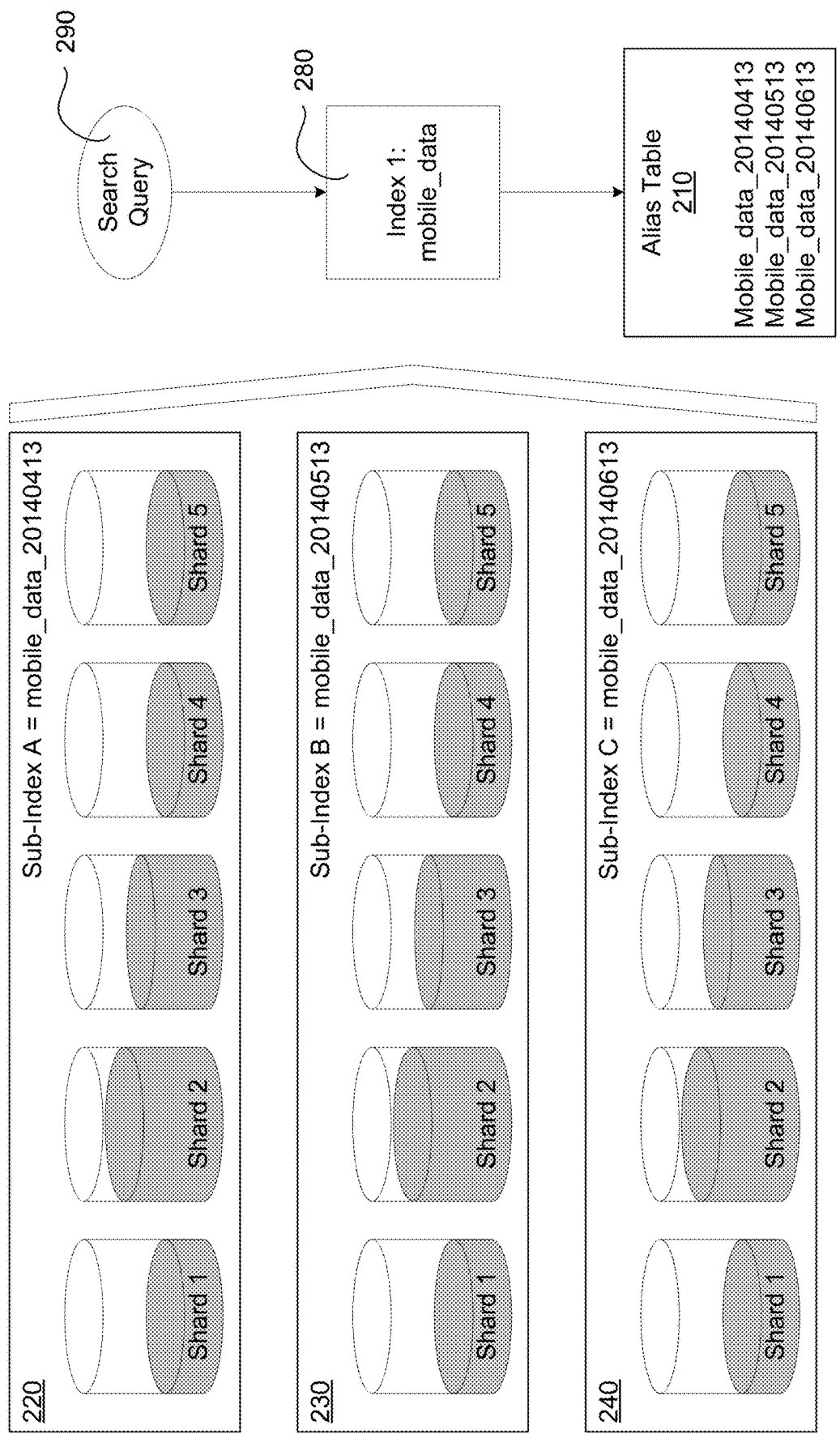
FIG. 2 is a block diagram depicting partitioned indices aggregated through an alias table, according to an embodiment of the invention.

FIG. 2 is a block diagram depicting partitioned sub-indices 220, 230 and 240, aggregated through aliases, according to an embodiment of the invention. The partitioned sub-indices 220, 230, and 240 are also labeled as sub-index A, sub-index B and sub-index C. Each sub-index also identifies, in the depicted example, a long-name: mobile_data_20140413, mobile_data_20140513, and mobile_data_20140613, respectively. Each of sub-indices A-C may have one or more shards (for example, Shards 1-5). Sub-indices A-C may be generated based on, for example, a monthly partitioning schedule, whereby each of sub-indices A-C corresponds to data collected in that partitioned index on a given date in a given month and year; in this example, sub-index A may be from Apr. 13, 2014; sub-index B from May 13, 2014; and sub-index C from Jun. 13, 2014.

Sub-indices A-C may be generated and associated with Index 1, which may be a unified index 280. Index 1 may also be referred to as mobile_data, in this example. An alias table 210 includes a list of sub-indices 220 and their associations with Index 1, as well as other information about each index or sub-index, which may be stored as associated metadata. Alias table 210 helps relate the existing partitions of Index 1 to one another and gives a level of abstraction for a query module 290 used in Big Data-based search and analytics engines.

While partitioning an index allows for maintaining different types of data sets, it is also useful to determine what type of partition is created when an index is partitioned. For example, there are many types of configurations that require an index to be created. In the prior art, in these circumstances, indices are created using a standard profile for creating a partitioned index. This prior art approach is not efficient, in part because the standard profile is not based on dynamically determined factors derived from changing properties of the index. Rather, the standard profile is a one-size fits all solution that is not properly tailored to the index.

Figure 3A:
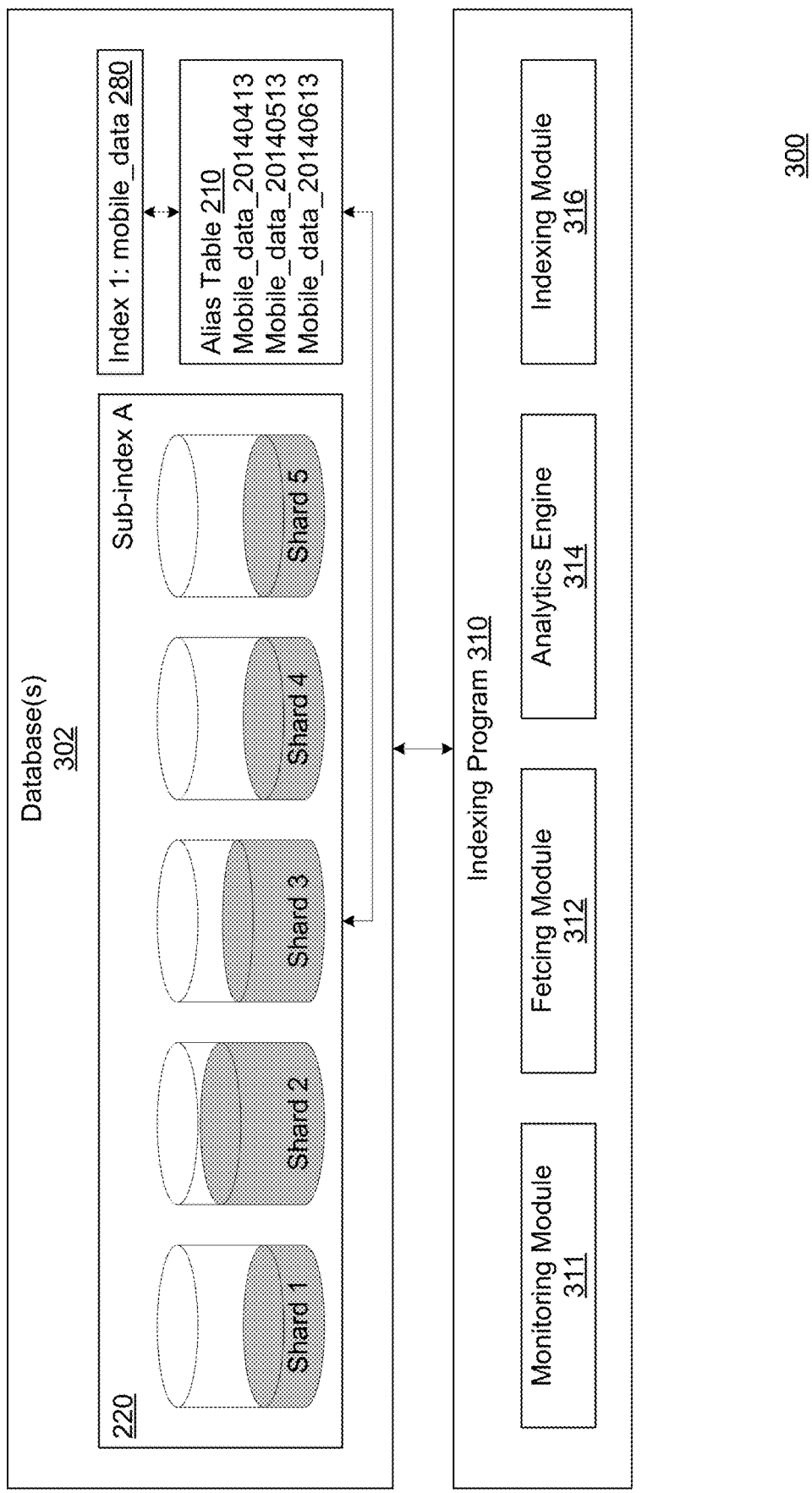
FIG. 3A is a block diagram depicting an indexing system for partitioning an index, according to an embodiment of the invention.

FIG. 3A is a block diagram depicting an indexing system 300 for repartitioning an index 280, also referred to as Index 1, according to an embodiment of the disclosure. Indexing system 300 may include one or more computing devices as described in connection with FIG. 5, below. Index 1 may include or be associated with a set of properties that define aspects of the index. In the depicted example, Index 1 may also include one or more sub-indices A-C.

According to an embodiment of the invention, properties of Index 1, may include, without limitation: data size; creation date; modification date; number of sub-indices; number of shards; the total size of data in the index; the total size of each shard; the data in each shard; a time value corresponding to time elapsed since a previous partitioning of the index; a search timeout indication corresponding to the index (where, for example, the index is searched but the search results in a timeout error); a metric measuring uneven data distribution over shards in an index (for example, measured as the difference between data size of the largest shard and the smallest shard); shard/index size limits; data retention metrics; access details; and event types. These are merely examples. Other properties are possible.

Indexing system 300 may further include an indexing program 310 for execution by a processor (not shown) of indexing system 300 to perform a method, such as method 400 described in connection with FIG. 4, below.

Indexing system 300 may also include one or more databases 302. Database 302 may be distributed over one or more nodes (for example, search nodes 120 described in connection with FIG. 1, above). Database 302 may store one or more indices and/or sub-indices, such as those described in connection with FIG. 2, above. As shown in FIG. 3A, these indices may include, for example, index 280, also referred to as Index 1, containing the mobile_data index. Index 1 may be associated with one or more sub-indices, such as sub-index A-C. The association between Index 1 and sub-index A may be reflected in an alias table 210. Additional sub-indices of Index 1 are omitted from FIG. 3A for clarity.

Indexing program 310 may include one or more programming modules including, for example, a monitoring module 311, a fetching module 312, an analytics engine 314, and an indexing module 316. Functions of these modules are described in greater detail below, in connection with method 400 and FIGS. 3A-B and FIG. 4.

Figure 3B:
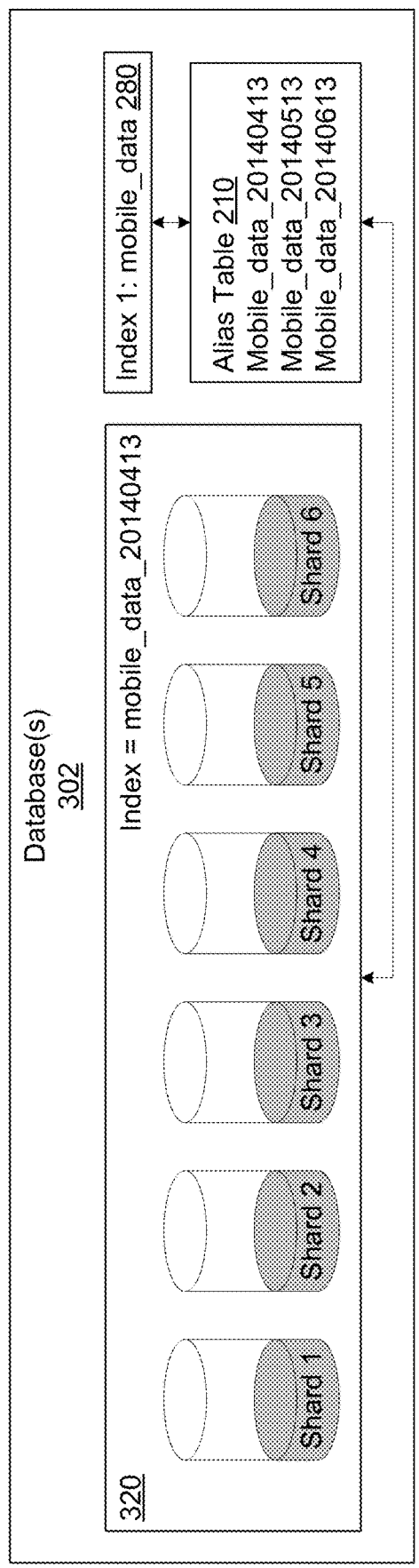
FIG. 3B is a block diagram depicting a partitioned index generated by the indexing system of FIG. 3A, according to an embodiment of the invention.

FIG. 3B is a block diagram depicting a repartitioned sub-index 320 generated by indexing system 300 of FIG. 3A, according to an embodiment of the disclosure. Repartitioned sub-index 320 may be a modified version of sub-index 220 (also labeled as sub-index A in FIG. 3A), and is discussed in greater detail below, in connection with method 400 and FIGS. 3A-B and FIG. 4.

Figure 4:
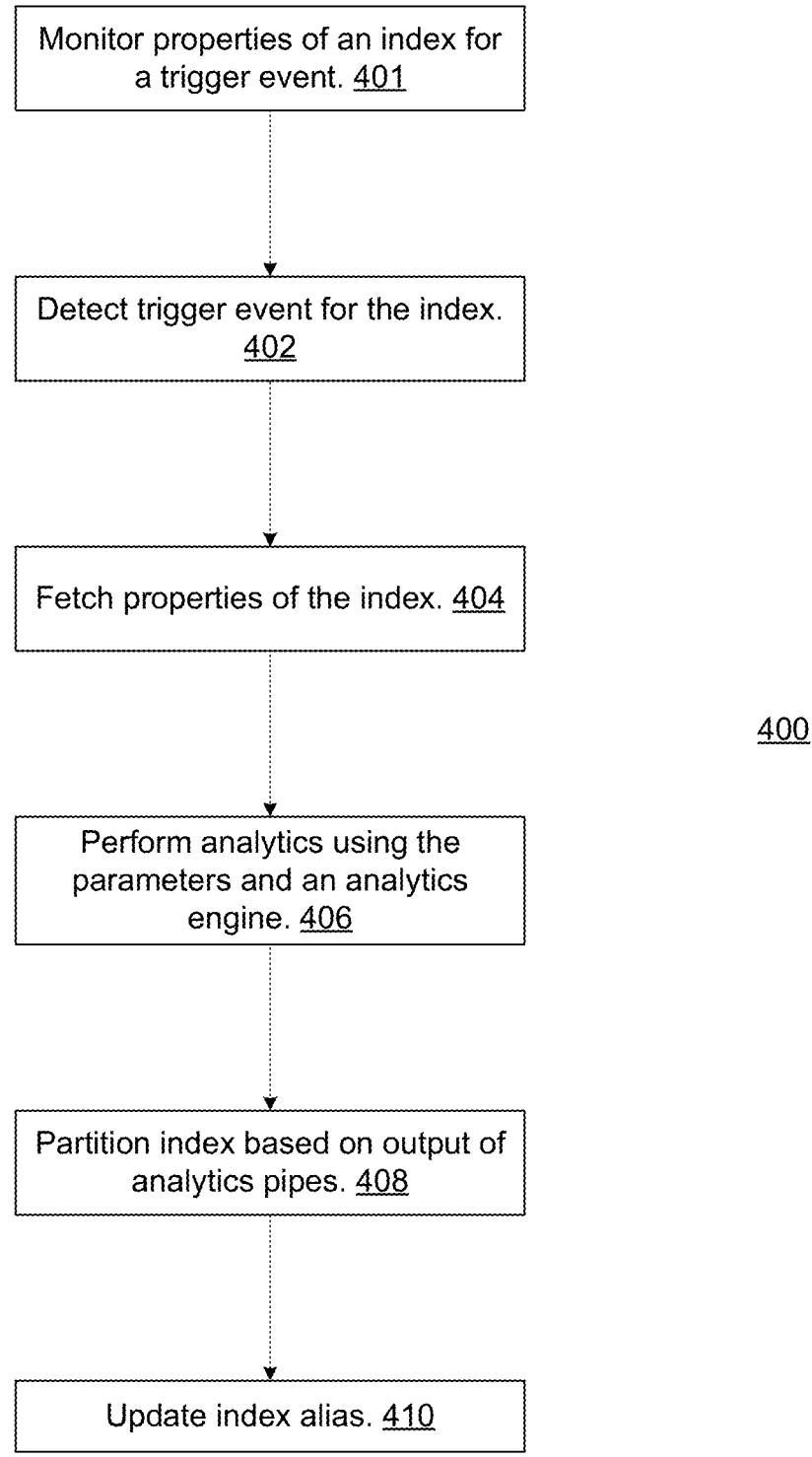
FIG. 4 is a flowchart of a method for partitioning a partitioned index, according to an embodiment of the invention.

FIG. 4 is a flowchart of a method 400 for partitioning/repartitioning an index, according to an embodiment of the disclosure. Steps of method 400 may be implemented using one or more of the program modules of indexing program 310 executed by a processor of system 300 (FIG. 3A).

Referring now to FIGS. 3A, 3B and 4, at step 401 of method 400, monitoring module 311 monitors properties of an index, such as index 280, also referred to as Index 1, or a sub-index 220, such as sub-index A, for a trigger event. Index 280 or sub-index 220 may also be referred to as a monitored index.

A trigger event may be defined as one or more conditions or states in which properties of the monitored index (such as index 280 or sub-index 220) match one or more predefined triggers. Trigger definitions may be stored in database 302 or on another database on another system. Triggers may be defined based on one or more values or states that the properties can have; they may include, for example: a data size threshold (for example, data size of a shard, of an index, or a sub-index); a number of documents stored threshold (the threshold may apply to a shard, index, or sub-index); a time threshold corresponding to time elapsed since a previous partition (this may be based on a regular schedule such as weekly, monthly, quarterly, etc.); a search timeout (for example, a search engine attempts to search the index but experiences a timeout, which may indicate that the data in the index cannot be searched efficiently); or data is old and needs a fresh partition (for example, the data may no longer be valid, even though not much time has passed since a previous repartition).

The properties of the monitored index, such as index 280 or sub-index 220, may be stored as metadata, as part of the monitored index itself or in an associated data store (for example, a properties file).

Monitoring functions by monitoring module 311 may include, in one embodiment, periodically querying properties of the monitored index and evaluating the state of the monitored index (or the state of one or more properties) to determine whether they correspond to a defined trigger event.

For example, as shown in FIG. 3A, sub-index A includes five shards (Shards 1-5). Each shard may include some data. In the depicted example, the data may be unevenly distributed among the various shards, where Shard 2, for example, includes a relatively large data set compared to Shards 1, 4 and 5. This may constitute a trigger event based on predefined triggers: for example, the difference between the data size of the largest shard and the smallest shard exceeding 5 GB may be a trigger event. Therefore, monitoring module 311 may detect this trigger event at step 402, as is described further below.

Monitoring module 311 may monitor the monitored index (for example, index 280 or sub-index 220) properties periodically to determine whether they correspond to a defined trigger. In one example, monitoring module 311 may compare the monitored index properties to the trigger definitions on a daily, weekly, monthly, or quarterly basis. Additional or different monitoring schedules are also possible.

At step 402, monitoring module 311 may detect a trigger event based on the state of the monitored index matching a predefined state. For example, the size of Shard 2 in sub-index A (FIG. 3A) may exceed the size of Shards 1 and 3-5 by more than a predefined variance threshold. This may be undesirable because this trigger event indicates that data in sub-index A is not evenly distributed. Uneven data distribution may be undesirable because it wastes resources and slows searching of Index 1 and its sub-indices by query module 290 (FIG. 2).

At step 404, fetching module 312 fetches properties of the monitored index (for example, Index 1 or sub-index A) from a memory device where they are stored (such as database 302). The fetched properties may be used in other steps to generate one or more new partitions/repartitions. For example, fetching module 312 may fetch the properties of sub-index A (sub-index 220 in FIG. 3A); these properties may include identifying information of Shards 1-5, their size information, and additional related data, as well as other properties described above.

At step 406, analytics engine 314 receives the properties fetched by fetching module 312 and executes one or more analytic pipes to analyze and process the properties of the monitored index whose state causes the trigger detection at step 402. Analytics engine 314 analyzes these properties and determines how to reparation the received index according to a dynamically determined partitioning/repartitioning policy.

Prior to describing specific functions of analytics engine 314, a detailed description is provided of a pipes programming model that may support various analytic functions of analytics engine 314, according to an embodiment of the invention.

According to an embodiment of the invention, analytics engine 314 may function as follows: analytics engine 314 may be based on a pipes programming model. The pipes programming model includes a concept termed herein as a "pipe." A pipe, as described herein, represents a logical construct that includes search and visualization instructions defined within a supporting programming/scripting language syntax (e.g., Python®, though many others are possible). A pipes programming model provides an architecture that defines and executes a pipe with a sequential search, modification/cleansing of searched data, and visualization of the data using a single thread request/response paradigm. As such, the pipes programming model provides compartmentalized processing of several analytical operations on data and the return of results of the analytical operations using a single hypertext transfer protocol (HTTP) request, a single HTTP thread of operation at an HTTP server, and a single HTTP response from the server by the single server HTTP thread.

A "piped HTTP request," as described herein, represents an HTTP request by analytics engine 314 that includes/encapsulates scripted code that is requested to be executed against a dataset by the HTTP server under the single thread of operation. The execution of the scripting language may be performed in a native scripting language runtime associated with the scripted code by the single thread of operation. A "piped HTTP response," as described herein, represents an HTTP request that includes/encapsulates the results of execution of scripted code returned by the single HTTP thread that are created in response to receipt of the piped HTTP request. The scripted code may include scripted syntax executable to perform search functions, data manipulation functions, and data visualization functions. As such, the pipes programming model described herein provides a comprehensive solution to data analytics that may improve data analysis for data sets, including large distributed data sets.

In analytics engine 314, a web application is one example of a source platform within which a pipes programming model may be implemented and where a user (the user may be a program, automated process, or system) may configure and initiate piped HTTP requests for analytics, as described above and in more detail below. In one example, the user may be indexing program 310 or fetching module 312. A middleware analytics platform is utilized herein as a target platform within which the pipes programming model may be implemented and where piped HTTP requests may be executed. It is understood that other platform possibilities exist that may be utilized as a source and target platform for implementation of the pipes programming model and all such possibilities are considered within the scope of the present technology.

The search may include a distributed, batch-oriented search that is requested to be performed within the piped HTTP request using embedded scripted code within the piped HTTP request. The distributed, batch-oriented search may be performed by the HTTP server under a single thread of operation across distributed and local data nodes to query for the search results (e.g., search hits). The result of this search may be manipulated under the same thread of operation as specified by the scripted code within the HTTP request. The results of the search and/or data manipulation may be visualized through charting libraries, again under the same thread of operation and as also specified by the scripted code within the piped HTTP request. The manipulated and/or visualized search results may be returned as the response to the piped HTTP request, again under the same thread of operation. As such, a single HTTP request may be processed by an HTTP server to perform search, data manipulation, and data visualization operations on behalf of the user requesting the piped HTTP request. The results of the piped HTTP request may be rendered on a display device or other rendering output may be generated, and the rendered output may be presented to the user. Accordingly, data analytics may be improved by use of the pipes programming model described herein.

Scripting languages, such as Python®, JavaScript®, PHP: Hypertext Preprocessor (PHP), and Perl scripting languages, may be used as the scripting language within which the scripted code within the piped HTTP request is syntactically formulated/created. Other scripting languages may also be used, as appropriate for a given implementation. As described above, and in more detail below, the scripted code is used in combination with the piped HTTP request and distributed search technologies to provide descriptive analytics for search and visualization of complex data.

As described above, a piped HTTP request results in creation of a new thread within the target platform that implements the pipes programming model. The target platform may alternatively be referred to as a middleware analytics platform. The target platform executes the pipes that are requested. The newly-created thread interprets the instructions provided in the respective sequential scripting language that defines the pipe and executes the pipe in association with the target platform. Some examples of instructions in a pipe may be as follows. A first type of instruction in a pipe includes a search function. A second type of instruction in a pipe includes a data manipulation function. A third type of instruction in a pipe includes a data visualization function. Other instructions are possible.

Regarding possible search functions, search_hits (e.g., searches for raw results based on a search criteria), search_termfacet (e.g., searches for facets or distribution of values across a specific field), search_datetimehistogram (e.g., searches for distribution of events across a histogram defined by date and time of the documents), and similar search specifications represent example search functions that may be utilized to implement a search of complex data using a single HTTP thread within the target platform. Regarding possible data manipulation functions, sort (e.g., sorting of received results based on value of fields), filter (e.g., filtering out unwanted noise in the results obtained using search functions), map (e.g., re-ordering different values in a way that may more-easily/understandably be visualized), group (e.g., aggregating received results into groups based on a characteristic of the data), and similar data manipulation specifications represent example data manipulation functions that may be utilized to implement data manipulation of search results of complex data using the single HTTP thread within the target platform. Regarding possible data visualization functions, chart_pie (e.g., visualizing as a pie chart to visualize value distribution), chart_stats (e.g., visualizing minimum, maximum and mean values), chart_chord (e.g., visualizing chord distribution of various data types to indicate relationships), chart_heatmap (e.g., visualizing heat map distribution of the values represented in the search results, such as memory utilization across servers), chart_timeline (e.g., visualizing a timeline chart showing a sequence of events in a timeline), chart_horizon (e.g., visualizing variations of values shown in a timeline), and similar data visualization specifications represent example data visualization functions that may be utilized to implement visualized output of manipulated search results of complex data using the single HTTP thread within the target platform. It should also be noted that while the example functions described above are utilized for purposes of example, other search functions, data manipulation functions, and data visualization functions are possible and all such functions are considered within the scope of the present subject matter.

The analytics based on a pipes programming model described herein may be performed in real time to allow prompt visualization of complex data searches, data manipulation, and analytical data visualization. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms are well understood by those skilled in the art.

Additional examples of analytics pipes and methods of using them are described by the disclosure of commonly-owned, co-pending United States patent application filed on Mar. 29, 2013, the contents and disclosure of which is expressly incorporated by reference herein in their entirety: U.S. patent application Ser. No. 13/853,700, for "ANALYTICS BASED ON PIPES PROGRAMMING MODEL".

With continued reference to FIGS. 3A, 3B and 4, based on the pipes programming model described above, analytics engine 314 may generate a new request (for example, an HTTP request) including/encapsulating scripted code that is requested for execution against a dataset by the HTTP server component of analytics engine 314. The new request may be a partition/repartition request. The code specified by the request for execution may be code that implements a dynamic indexing/partitioning policy that takes into account current and evolving properties of the monitored index, rather than limiting itself to default indexing/partitioning policies in use in the prior art.

According to an embodiment of the invention, the dynamic partitioning policy for the monitored index may be as follows, where the monitored index contains data generated by at least one or more mobile devices (such as Index 1 and/or sub-index A). Analytics engine 314 may execute the pipe to search for properties of the monitored index; for example, its number of shards, data retention parameters, size limit, event types, access details, etc. Analytics engine 314 may also search properties that indicate the number of unique devices generating the mobile data and pumping the data into the monitored index. Based on this descriptive analytics, analytics engine 314 may create an optimized routing table and number of shards based on the dynamic partitioning policy. For example, analytics engine may determine that a percentage of queries by query module 290 (FIG. 2) higher than a predefined threshold value are more likely to result in search timeouts where the queried index contains data from more than 100 mobile devices. Analytics engine 314 may therefore determine, as part of a dynamic partitioning policy, that each index/re-partitioned index that it generates should include data from no more than 100 distinct mobile devices.

According to a further embodiment, analytics engine 314 may assess the existing data population in the monitored index over a prior time period (for example, a month), and determine, as part of a dynamic partitioning policy, an optimal number of shards based on a predefined limit on the data size of shards. For example, where the monitored index grows to more than 300 GB, and given a general policy to limit shard sizes to 20 GB, analytics engine 314 may determine that new or repartitioned indices should include at least 30 shards, instead of a default number of shards that may otherwise be created (for example, 5) under a non-dynamic policy.

According to a further embodiment of the invention, analytics engine 314 may determine the location (for example, zip code or GPS coordinates) from where the mobile data is being generated and pumped into the monitored index. Analytics engine 314 may determine, as part of a dynamic partitioning policy, to generate a partitioned index such that its search nodes are geographically nearer to that location. This may improve, for example, query speeds.

The above embodiments are merely examples, and other dynamic partitioning policies are possible.

At step 408, indexing module 316 may create a new index, partition an existing index, or repartition the existing index based on the output of the analytics pipes, and/or based on the monitored index (for example, Index 1 or sub-index A) and the dynamically generated repartitioning policy or policies of analytics engine 314, determined at step 406. In the example of sub-index 220 (sub-index A in FIG. 3A), analytics engine 314 may repartition it to generate sub-index 320 (also labeled as sub-index A in FIG. 3B) having six shards (compared to the previous count of five shards), wherein the sub-index 320 data is more evenly distributed among the six shards (as compared to the density of data in one shard compared to one or more other shards).

Indexing module 316 may, in an embodiment, cause re-fetching of the monitored index's properties and/or re-execute functions of analytics engine 314 to determine a revised partitioning policy or partitioning plan, where an existing partitioning plan is determined not be optimal for any reason (for example, where not enough information is available to assess the desirability of a proposed partition plan/configuration).

According to a further embodiment of the invention, monitoring module 311 may pause indexing operations and cause the partitioning/repartitioning functions of indexing program 310 to be performed atomically, such that possible new indexing operations do not interfere with the partitioning/repartitioning functions. A new partition/repartition may therefore be created atomically, and discarded if it is not successfully generated.

At step 410, indexing module 316 may update alias table 210 to reflect the new partitioning/repartitioning of the monitored index. The updating function may include, for example, generating a new alias and/or changing existing aliases and adding them to the alias table 210.

Figure 5:
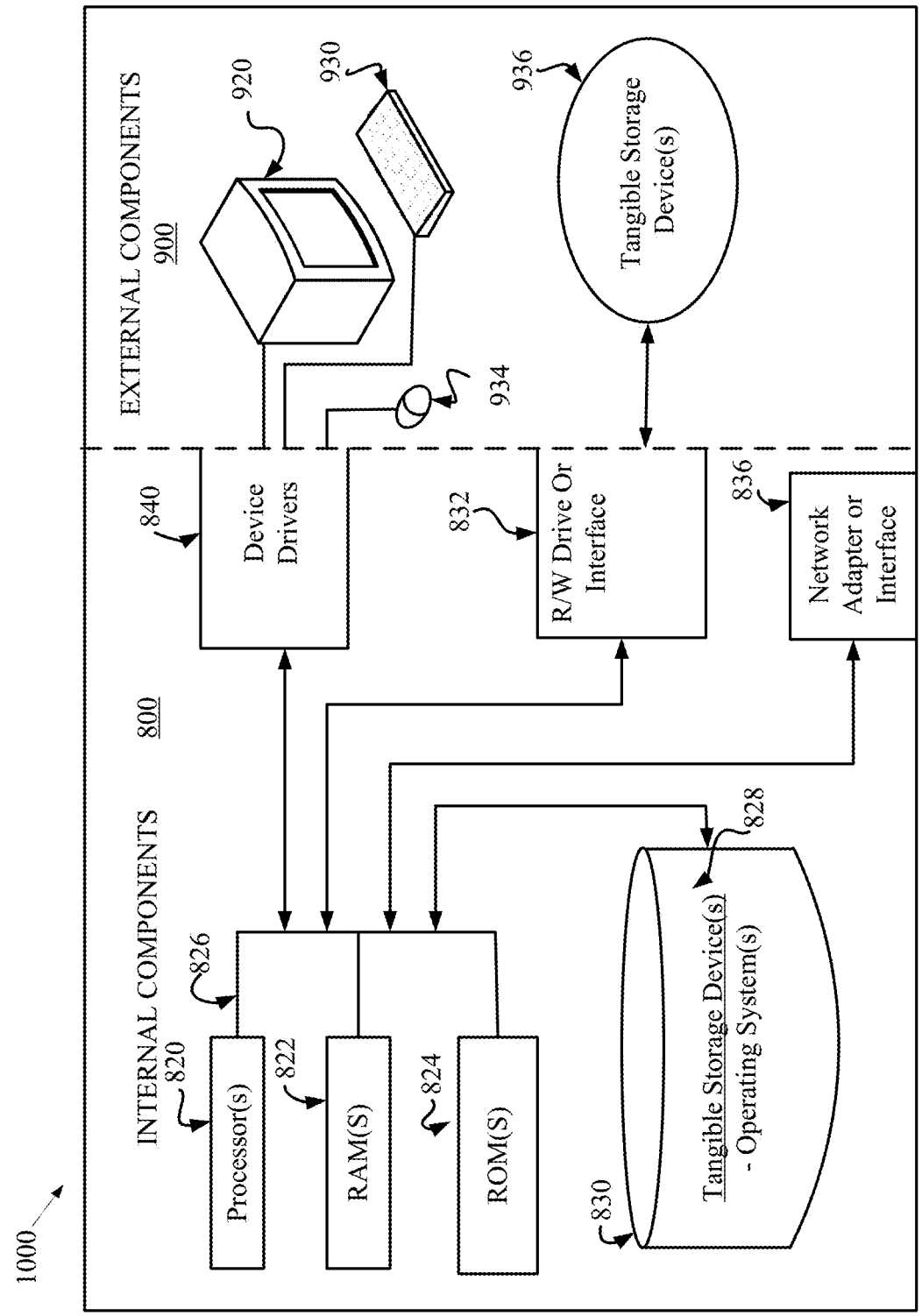
FIG. 5 is a block diagram depicting a computer system for partitioning an index, according to an embodiment of the invention.

Referring now to FIG. 5, a computing device 1000 (e.g., computer system 300 in FIG. 3) may include respective sets of internal components 800 and external components 900.

Each of the sets of internal components 800 includes one or more processors 820; one or more computer-readable RAMs 822; one or more computer-readable ROMs 824 on one or more buses 826; one or more operating systems 828; one or more software applications (e.g., device driver modules) executing the program x38; and one or more computer-readable tangible storage devices 830. The one or more operating systems 828 and device driver modules are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 6:
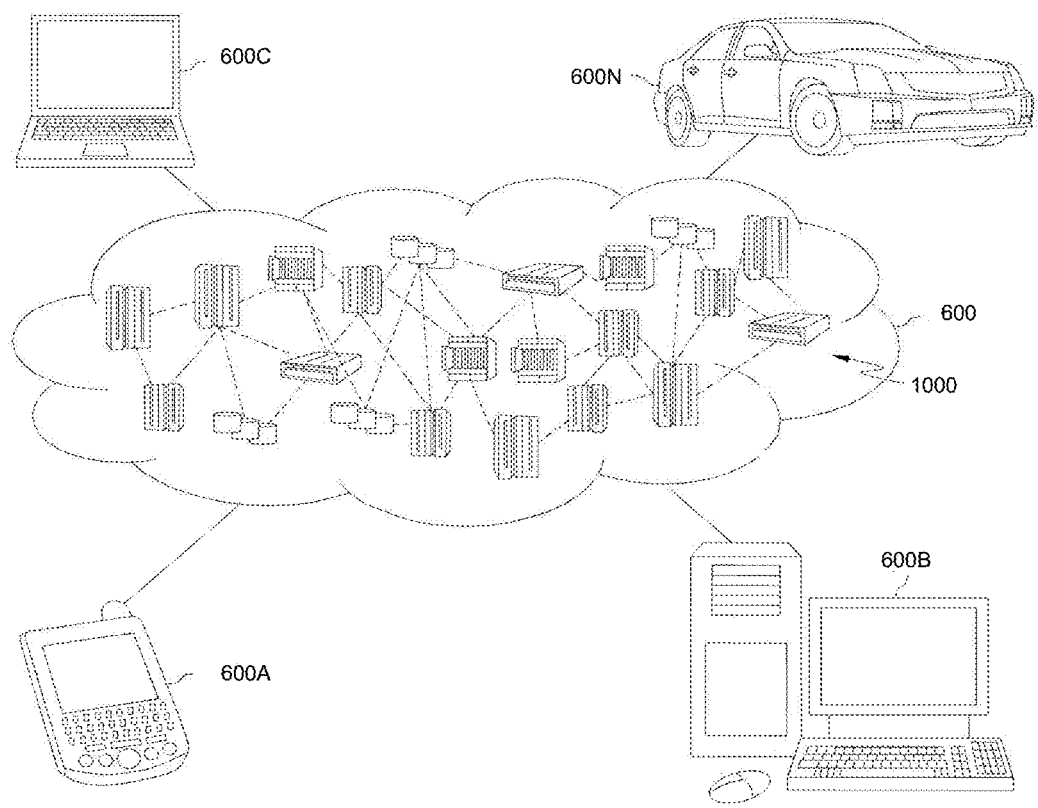
FIG. 6 is a block diagram depicting a cloud computing environment, according to an embodiment of the invention.

Referring now to FIG. 6, an illustrative cloud computing environment 600 is depicted. As shown, the cloud computing environment 600 comprises one or more cloud computing nodes, each of which may be a system 1000 with which local computing devices used by cloud consumers, such as, for example, a personal digital assistant (PDA) or a cellular telephone 600A, a desktop computer 600B, a laptop computer 600C, and/or an automobile computer system 600N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that the computing nodes 1000 and the cloud computing environment 600 can communicate with any type of computerized device over any type of network and/or network addressable connection (e.g., using a web browser).

Figure 7:
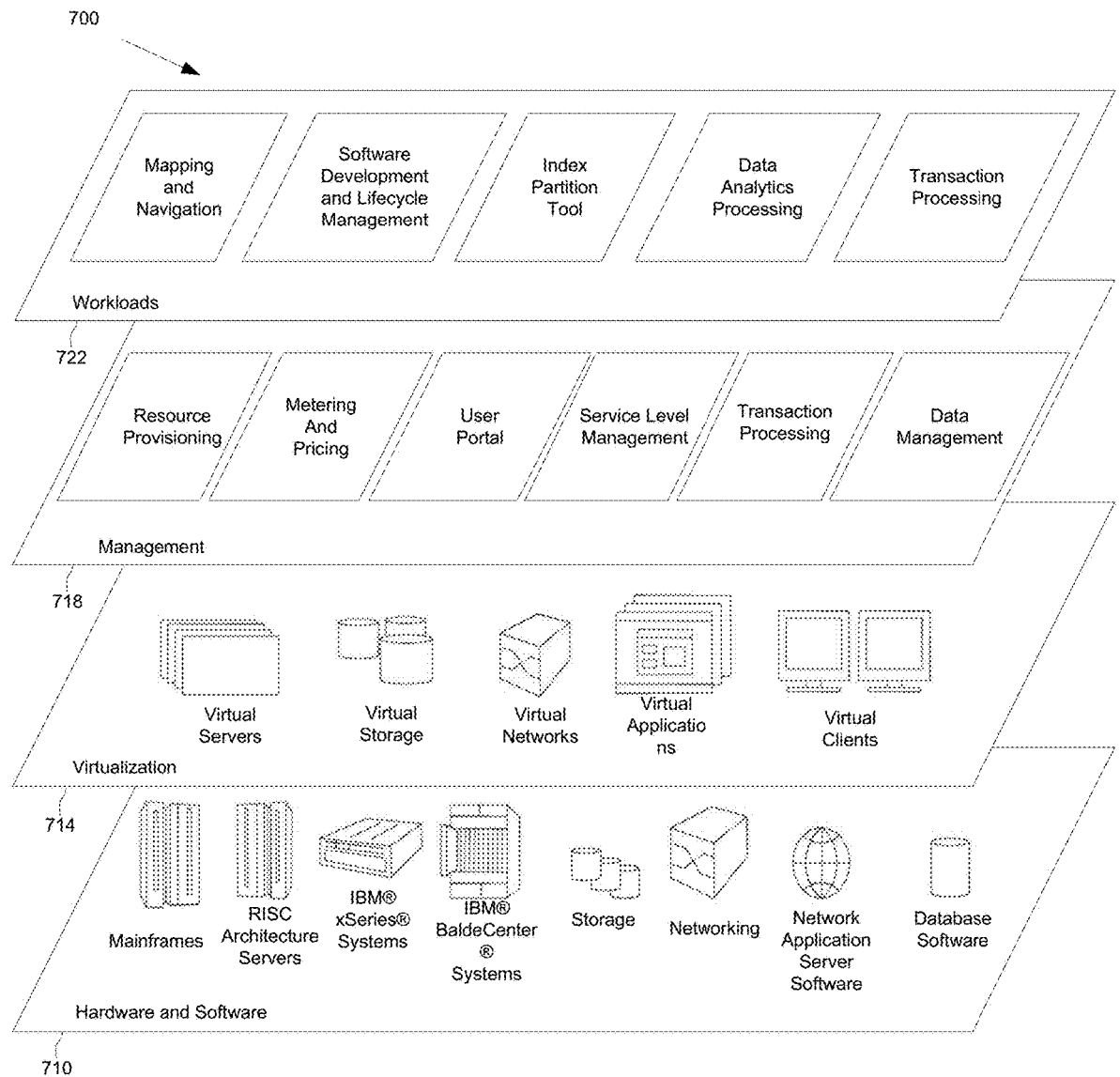
FIG. 7 is a block diagram depicting functional work layers in the cloud computing environment of FIG. 6, according to an embodiment of the invention.

Referring now to FIG. 7, a set of functional abstraction layers 700 provided by the cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

The hardware and software layer 710 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 714 provides an abstraction layer from which the following examples of virtual entities may be provided: virtual servers; virtual storage; virtual networks, including virtual private networks; virtual applications and operating systems; and virtual clients.

In one example, the management layer 718 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 722 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a tool for partitioning an index, such as that provided for by embodiments of the present disclosure described in FIGS. 1-4.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a partition of an index, the method comprising:
monitoring one or more properties of the index;
based on the monitoring, receiving a trigger event to partition the index;
fetching the one or more properties of the index;
based on the fetching, executing one or more analytics pipes to determine a dynamically generated partition configuration of the index, wherein the dynamically generated partition configuration of the index is based on:
determining a number of unique mobile devices generating data of the index being below a threshold number, wherein the threshold number is determined based on a percentage of queries resulting in a search timeout is above a threshold percentage when the number of unique mobile devices is above the threshold number;
determining location(s) of one or more of the unique mobile devices; and
selecting one or more search nodes for hosting shards containing data from the unique mobile devices, wherein the selecting is based on the one or more search nodes being within a predetermined geographic distance of the determined location(s); and
based on the executing, partitioning the index according to the dynamically generated partition configuration, wherein partitioning the index is performed atomically.

2. The method of claim 1, wherein executing the one or more analytic pipes comprises:
executing the analytic pipe using a descriptive analytics engine.

3. The method of claim 1, wherein the one or more analytics pipes use a single hypertext transfer protocol (HTTP).

4. The method of claim 1, further comprising:
receiving a data set of an index;
generating an index alias of the index; and
aggregating the index alias and one or more additional index aliases in an alias table.

5. The method of claim 1, wherein the index comprises data generated by a mobile device.

6. A method for generating a partition of an index, the method comprising:
monitoring one or more properties of the index;
based on the monitoring, receiving a trigger event to partition the index;
fetching the one or more properties of the index;
based on the fetching, executing one or more analytics pipes to determine a dynamically generated partition configuration of the index, wherein the dynamically generated partition configuration of the index is based on:
determining a number of unique mobile devices generating data of the index;
determining location(s) of one or more of the unique mobile devices; and
selecting one or more search nodes for hosting shards containing data from the unique mobile devices, wherein the selecting is based on the one or more search nodes being within a predetermined geographic distance of the determined location(s); and
based on the executing, partitioning the index according to the dynamically generated partition configuration, wherein partitioning the index is performed atomically; and
repartitioning the index based on a new dynamically generated partition configuration, wherein the new dynamically generated partition configuration is based on generated data received after partitioning the index, and wherein repartitioning the index is performed atomically.

7. The method of claim 6, wherein executing the one or more analytic pipes comprises:
executing the analytic pipe using a descriptive analytics engine.

8. The method of claim 6, wherein the one or more analytics pipes use a single hypertext transfer protocol (HTTP).

9. The method of claim 6, further comprising:
receiving a data set of an index;
generating an index alias of the index; and
aggregating the index alias and one or more additional index aliases in an alias table.

10. The method of claim 6, wherein the index comprises data generated by a mobile device.

* * * * *